United States Patent
Rygh et al.

(10) Patent No.: US 7,400,590 B1
(45) Date of Patent: Jul. 15, 2008

(54) SERVICE LEVEL TO VIRTUAL LANE MAPPING

(75) Inventors: Hans Rygh, Oslo (NO); Steinar Forsmo, Oslo (NO); Ola Torudbakken, Oslo (NO)

(73) Assignee: Sun Microsystems, Inc., Santa Clara, CA (US)

( * ) Notice: Subject to any disclaimer, the term of this patent is extended or adjusted under 35 U.S.C. 154(b) by 676 days.

(21) Appl. No.: 10/862,985

(22) Filed: Jun. 8, 2004

(51) Int. Cl.
*H04L 12/28* (2006.01)
*H04L 12/56* (2006.01)
(52) U.S. Cl. .................................. 370/254; 370/392
(58) Field of Classification Search .................. 370/389
See application file for complete search history.

(56) References Cited

U.S. PATENT DOCUMENTS

| | | | |
|---|---|---|---|
| 7,150,021 B1* | 12/2006 | Vajjhala et al. ............. | 718/104 |
| 2002/0150106 A1* | 10/2002 | Kagan et al. ............. | 370/395.6 |
| 2003/0188056 A1* | 10/2003 | Chemudupati ............... | 710/51 |
| 2003/0193942 A1* | 10/2003 | Gil .............................. | 370/389 |
| 2003/0200315 A1* | 10/2003 | Goldenberg et al. ........ | 709/225 |
| 2003/0223435 A1* | 12/2003 | Gil .............................. | 370/400 |
| 2003/0223453 A1* | 12/2003 | Stoler et al. ................. | 370/444 |
| 2004/0252685 A1* | 12/2004 | Kagan et al. ................. | 370/389 |

\* cited by examiner

*Primary Examiner*—Seema S. Rao
*Assistant Examiner*—Jianye Wu
(74) *Attorney, Agent, or Firm*—Park, Vaughan & Fleming LLP (57) ABSTRACT

An Infiniband device can be provided. The device can have an input port for receiving a packet. The port can be operable to extract a destination descriptor and a quality of service requirement descriptor for the packet and simultaneously to determine an output port of the device for onward transmission of the packet on the basis of the destination descriptor and to determine an output port virtual lane for each output port of the device on the basis of the quality of service requirement descriptor. The port can additionally be operable subsequently to use the determined output port to select between the determined output port virtual lanes.

14 Claims, 8 Drawing Sheets

SERVICE LEVEL TO VIRTUAL LANE MAPPING

RELATED APPLICATIONS

The present application is related to the following applications, all of which are filed on the same day and assigned to the same assignee as the present application:

"METHOD AND APPARATUS FOR VERIFYING SERVICE LEVEL IN A COMMUNICATIONS NETWORK" (application Ser. No. 10/863,019 filed 8 Jun. 2004), Inventors: Bjorn Dag Johnsen, Christopher Jackson, David Brean and Ola Torudbakken;

"SWITCH METHOD AND APPARATUS WITH CUT-THROUGH ROUTING FOR USE IN A COMMUNICATIONS NETWORK" (application Ser. No. 10/863,016 filed 8 Jun. 2004), Inventors: Bjorn Dag Johnsen, Hans Rygh and Morten Schanke;

"SWITCHING METHOD AND APPARATUS FOR USE IN A COMMUNICATIONS NETWORK" (application Ser. No. 10/862,970 filed 8 Jun. 2004), Inventors: Bjorn Dag Johnsen, Christopher Jackson, David Brean, Ola Torudbakken, Steinar Forsmo, Hans Rygh, Morten Schanke;

"METHOD AND APPARATUS FOR SOURCE AUTHENTICATION IN A COMMUNICATIONS NETWORK" (application Ser. No. 10/863,854 filed 8 Jun. 2004), Inventors: Bjorn Dag Johnsen, Christopher Jackson, David Brean, Ola Torudbakken;

"CREDIT ANNOUNCEMENT" (application Ser. No. 10/863,373, filed 8 Jun. 2004), Inventors: Morten Schanke, Hans Rygh, Marius Hansen and Mathias Hoddevik;

"ADAPTIVE CUT-THROUGH ALGORITHM" (application Ser. No. 10/862,987 filed 8 Jun. 2004), Inventors: Morten Schanke, Brian Manula and Magne Sandven;

"COMMA DETECTION" (application Ser. No. 10/863, 374 filed 8 Jun. 2004), Inventors: Magne Sandven, Morten Schanke and Brian Manula;

"INPUT AND OUTPUT BUFFERING" (application Ser. No. 10/863,038 filed 8 Jun. 2004), Inventors: Hans Rygh, Morten Schanke, Ola Torudbakken and Steinar Forsmo;

"CODEC IMPLEMENTATION FOR INFINIBAND" (application Ser. No. 10/863,439 filed 8 Jun. 2004), Inventors: Steinar Forsmo, Mathias Hoddevik and Magne Sandven;

"VCRC CHECKING AND GENERATION" (application Ser. No. 10/863,013 filed 8 Jun. 2004), Inventors: Steinar Forsmo, Hans Rygh, Morten Schanke and Ola Torudbakken;

"COMMUNITY SEPARATION ENFORCEMENT" (application Ser. No. 10/863,544 filed 8 Jun. 2004), Inventors: Ola Torudbakken and Bjorn Dag Johnsen;

"STUMPING MECHANISM" (application Ser. No. 10/863,372, filed 8 Jun. 2004), Inventors: Brian Manula, Ali Bozkaya and Magne Sandven.

The above-identified applications are all hereby incorporated by reference into the present application.

FIELD

The present invention relates to service level to virtual lane mapping, and in particular but not exclusively to service level to virtual lane mapping within a multi-virtual lane Infiniband device.

INTRODUCTION

In switches for Infiniband™ networks, there is a general requirement to reduce the latency through the switch such that transmission times of packets across the network can be reduced. One source of latency within conventional Infiniband™ switches can occur during the determination of a virtual lane to match a required service level for a packet to be transmitted from an Infiniband device.

SUMMARY OF THE INVENTION

The present invention has been made, at least in parts, in consideration of problems and drawbacks of conventional systems.

Viewed from a first aspect, the present invention provides an Infiniband device which can have an input port for receiving a packet. The port can be operable to extract a destination descriptor and a quality of service requirement descriptor for the packet and simultaneously to determine an output port of the device for onward transmission of the packet on the basis of the destination descriptor and to determine an output port virtual lane for each output port of the device on the basis of the quality of service requirement descriptor. The port can additionally be operable subsequently to use the determined output port to select between the determined output port virtual lanes. This arrangement provides a latency optimised approach for determining an output virtual lane for a packet. No delays are caused by determining a virtual lane for a determined output port for the packet after determining that output port as all possible virtual lanes are determined and then selected between once the port has been determined.

Viewed from a second aspect, the present invention provides an Infiniband device having an input port for receiving a data packet and a plurality of output ports for transmitting a data packet. Each output port can support a plurality of virtual lanes. The input port can comprise: an interrogation unit for extracting a destination identifier and a service level identifier from the data packet; a first determining unit for determining an output port of the device on the basis of the destination identifier; a second determining unit for determining an output virtual lane for each output port of the device on the basis of the service level identifier, the second determining unit being operable in parallel with the first determining unit; and a selection unit for selecting between the determined output virtual lanes on the basis of the determined output port. This arrangement provides a latency optimised approach for determining an output virtual lane for a packet. No delays are caused by determining a virtual lane for a determined output port for the packet after determining that output port as all possible virtual lanes are determined and then selected between once the port has been determined.

Viewed from another aspect, the present invention provides a method for determining an output virtual lane for a packet for transmission from an Infiniband device. The method can comprise: in parallel using a destination descriptor of a destination for the packet to determine an output port for transmission of the packet, and using a service level descriptor of the packet to determine a virtual lane for transmission of the packet for each output port of the device; and using the determined output port for the packet to select between the virtual lanes determined for transmission of the packet, to select an actual virtual lane for transmission of the packet. This method provides a latency optimised approach for determining an output virtual lane for a packet. No delays are caused by determining a virtual lane for a determined output port for the packet after determining that output port as all possible virtual lanes are determined and then selected between once the port has been determined.

Particular and preferred aspects and embodiments of the invention are set out in the appended independent and dependent claims.

BRIEF DESCRIPTION OF FIGURES

Specific embodiments of the present invention will now be described by way of example only with reference to the accompanying figures in which.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF SPECIFIC EMBODIMENTS

One particular computer networking architecture is the Infiniband™ architecture. Infiniband™ is a standard architecture defined and administered by the Infiniband™ Trade Association, which was founded by Compaq, Dell, Hewlett-Packard, IBM, Intel, Microsoft and Sun Microsystems. The Infiniband™ Architecture defines a System Area Network (SAN) for connecting multiple independent processor platforms (i.e. host processor nodes), I/O platforms and I/O devices. A full definition of the Infiniband™ Architecture may be found in the Infiniband™ Architecture Specification Volumes 1 and 2, available from the Infiniband™ Trade Association. Infiniband™ defines a standard for flexible and high speed interconnect between computing systems or parts of computing system such as processor and I/O nodes. Infiniband™ allows an order of magnitude more flexibility and scalability than conventional bus based systems through a highly hardware coupled and low latency interface, which is a key factor in multiprocessing architectures.

The Infiniband™ Architecture SAN is a communications and management infrastructure supporting both I/O and interprocessor communications for one or more computer systems. An Infiniband™ Architecture system can range from a small server with one processor and a few I/O devices to a massively parallel supercomputer installation with hundreds of processors and thousands of I/O devices.

The Infiniband™ Architecture defines a switched communications fabric allowing many devices to concurrently communicate with high bandwidth and low latency in a protected, remotely managed environment. An endnode can communicate with over multiple Infiniband™ Architecture ports and can utilise multiple paths through the Infiniband™ Architecture fabric. A multiplicity of Infiniband™ Architecture ports and paths through the network are provided for both fault tolerance and increased data transfer bandwidth.

Infiniband™ Architecture hardware off-loads from the CPU much of the I/O communications operation. This allows multiple concurrent communications without the traditional overhead associated with communicating protocols. The Infiniband™ Architecture SAN provides its I/O and interprocessor communications clients zero processor-copy data transfers, with no kernel involvement, and uses hardware to provide highly reliable, fault tolerant communications.

Figure 1:
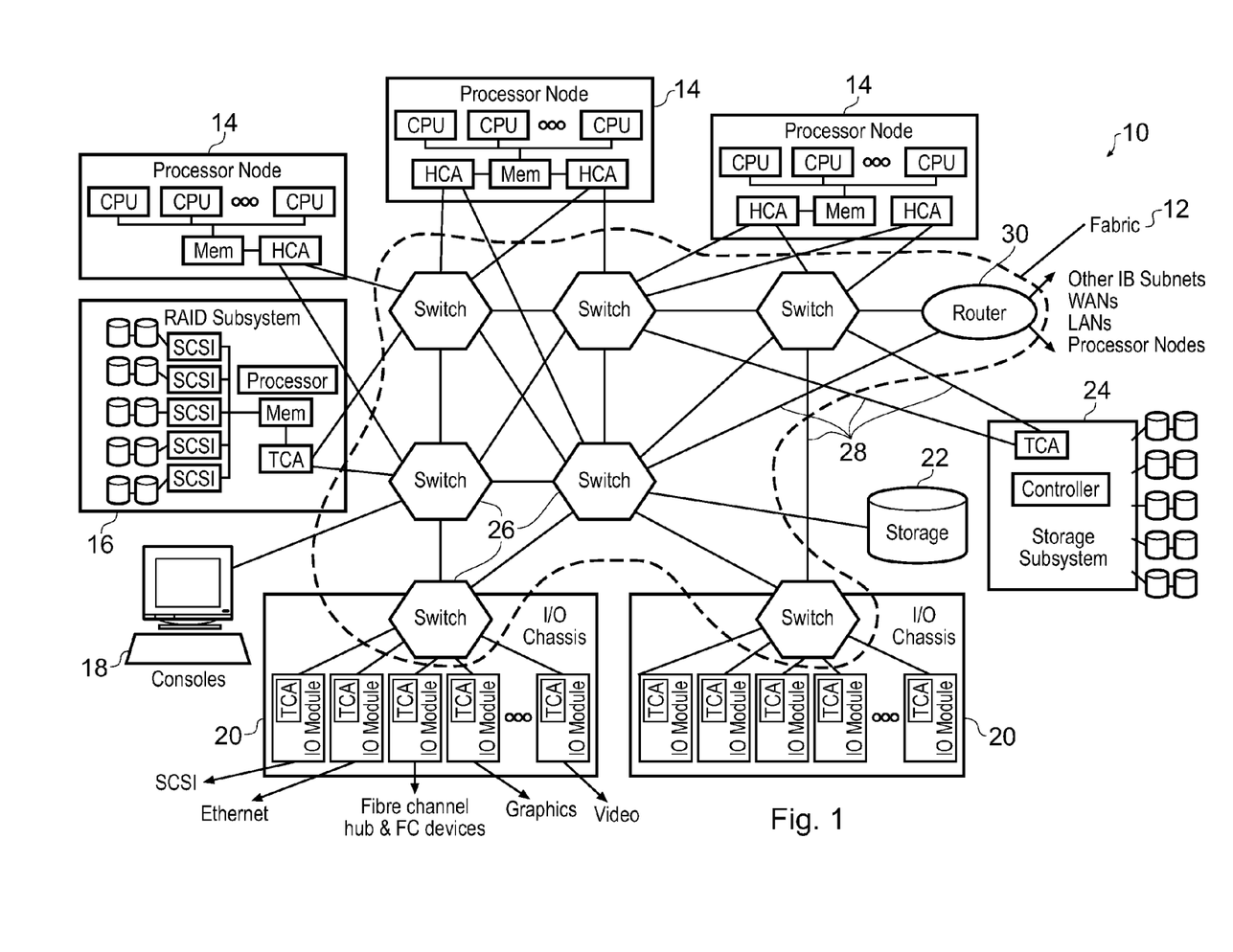
FIG. 1 is a schematic block diagram showing an example of interconnection of computing system elements via the Infiniband™ networking architecture.

An example of an Infiniband™ Architecture System Area Network is shown in FIG. 1. As can be seen from FIG. 1, a System Area Network 10 comprises an Infiniband™ Architecture fabric (or Subnet) 12 made up of cascaded switches and routers. The fabric 12 provides links between a number of processor nodes 14 and other nodes including a Raid Subsystem 16, consoles 18, I/O Chassis 20, Storage 22 and a Storage Subsystem 24. The Fabric 12 is made up of a plurality of switches 26 having interconnections 28 providing data connections therebetween and between the nodes attached to the fabric 12. Also comprised in the fabric 12 is a router 30 for providing connections to and from other networks, which may be other Infiniband™ Architecture subnets, non-Infiniband™ Architecture LANs and WANs and/or processor nodes. I/O units connected via the fabric 12 may range in complexity from single ASIC devices such as a SCSI (small computer systems interface) or LAN adapter to large memory rich RAID subsystems that rival a processor node in complexity. Collectively, the processor nodes 14, raid subsystems 16, consoles 18, I/O Chassis 20, Storage 22 and Storage Subsystems 24 are known as endnodes 32.

Each endnode 32 has therein a Channel Adapter, which may be a Host Channel Adapter (HCA) or a Target Channel Adapter (TCA). Host Channel Adapters are to be found in processor nodes 14, and Target Channel Adapters are to be found in I/O Nodes 16, 18, 20, 22 and 24. Host Channel Adapters are configured to issue requests across the fabric 12, and Target Channel Adapters are configured to respond to such requests, for example by supplying requested data or storing supplied data. Each Channel Adapter uses a queuing system based on Queue Pairs, one queue for send operations and one for receive operations. Each Queue Pair may therefore be considered to provide a virtual communication port of a Channel Adapter. Each Channel Adapter may have up to $2^{24}$ Queue Pairs, which may be assigned individually or in combination to handle operations affecting different parts (or consumers) of the endnode 32. For example, a processor node 16 may comprise a plurality of processors and each processor may have one or more individual Queue Pairs assigned to handle requests and responses flowing to and from that processor of that processor node 16 via the fabric 12. Alternatively, or in addition, a processor of a given processor node 16 may be running more than one process and each process may have one or more Queue Pairs assigned to handle requests and responses flowing to and from that process via the fabric 12.

The interconnects 28 may be one of three classes, 1×, 4× or 12×, referring to the number of parallel lanes making up that interconnect. Each lane is a single serial connection over a single physical signal carrier path (whether electrical or optical). Thus the bandwidth available to each interconnect is defined by a combination of the number of lanes and the maximum data rate of the physical signal carrier making up each lane.

Figure 2:
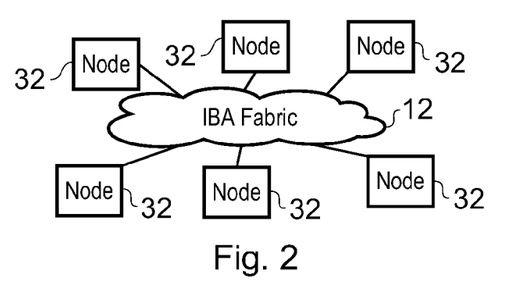
FIG. 2 is a schematic block diagram of a simplified arrangement of an Infiniband™ Architecture system.
Figure 3:
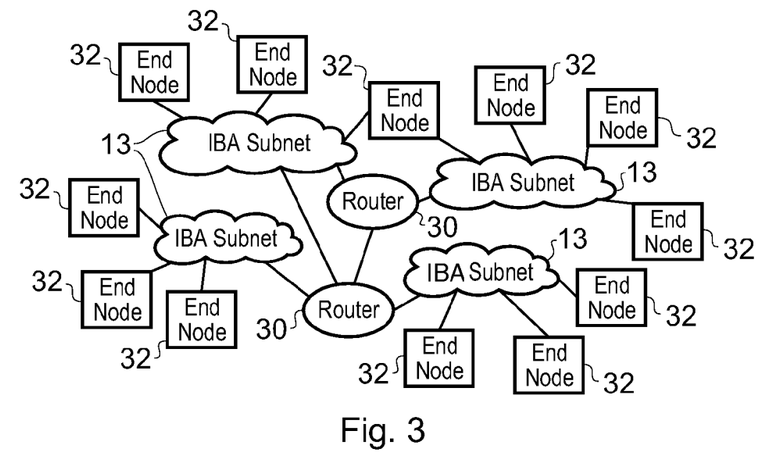
FIG. 3 is a schematic block diagram of another simplified arrangement of an Infiniband™ Architecture system.
Figure 4:
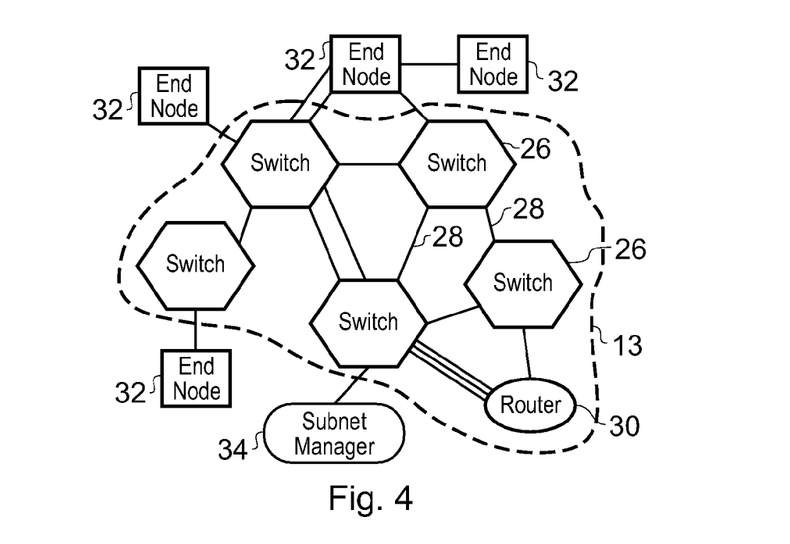
FIG. 4 is a schematic block diagram of a further simplified arrangement of an Infiniband™ Architecture system.

Examples of possible Infiniband™ Architecture topologies are shown in FIGS. 2, 3 and 4. FIG. 2 shows a high level simplified topology example where a number of endnodes 32 are interconnected by the fabric 12. An Infiniband™ Architecture network may be subdivided into subnets 13 interconnected by routers 30 as illustrated in FIG. 3. Any particular endnode 32 may be attached to a single subnet 13 or to multiple subnets 13. Shown in FIG. 4 is an example of the structure of a subnet 13. The subnet 13 comprises endnodes 32, switches 26, routers 30 and subnet managers 34 interconnected by links 28. Each endnode 32 may attach to a single switch 26, multiple switches 26 and/or directly with each other. In the case of direct connection between endnodes 32, the two or more directly linked endnodes effectively form an independent subnet with no connectivity to the remainder of the devices attached to the main subnet and one of the interconnected endnodes functions as the subnet manager for that link.

Figure 5:
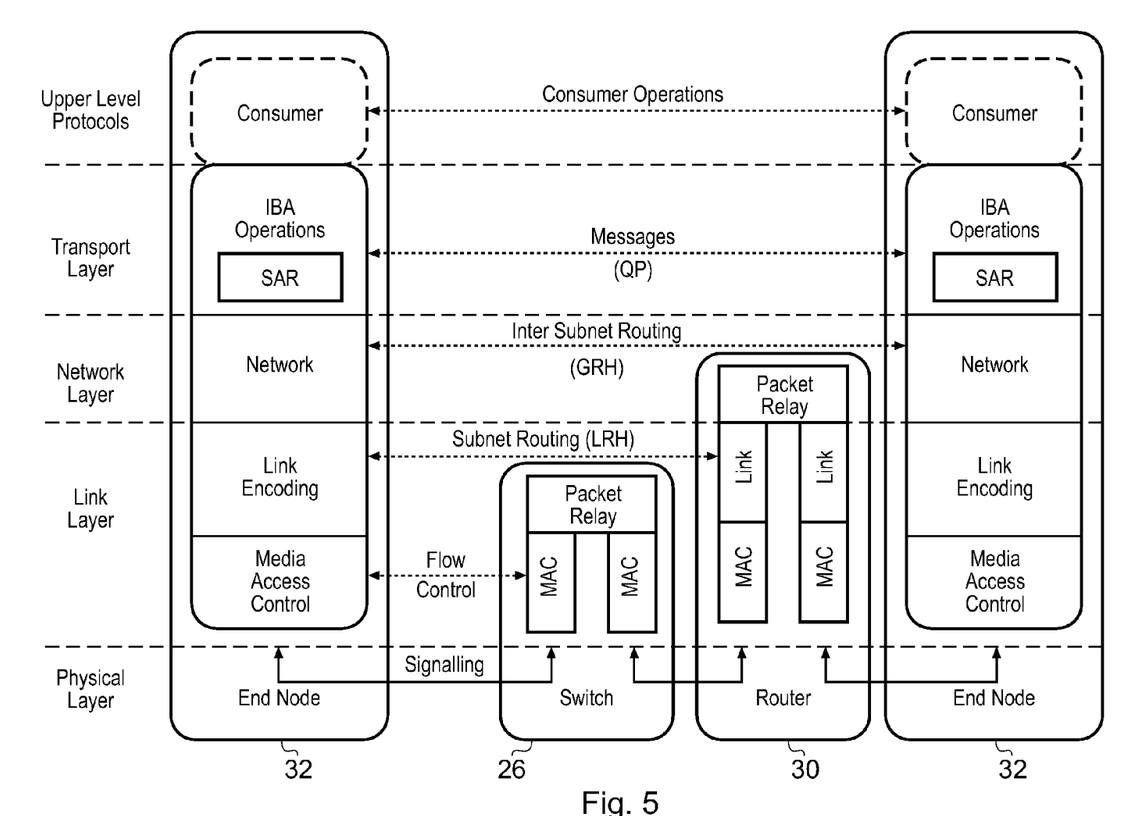
FIG. 5 shows a schematic illustration of the architecture layers of an Infiniband™ Architecture system.

Referring now to FIG. 5, there is shown an illustration of the architecture layers of an Infiniband™ Architecture system. Starting with the physical layer, this specifies how bits are placed onto the interconnections 28 and defines the symbols used for framing (i.e. start of packet and end of packet), data symbols and fill between packets (idles). It also specifies the signalling protocol as to what constitutes a validly formed packet (i.e. symbol encoding, proper alignment of framing symbols, no invalid or non-data symbols between start and end delimiter, no disparity errors, synchronisation method, etc.). The signalling protocol used by the Infiniband™ Architecture utilises a differential signal. The physical (or ethereal) interconnects 28 between nodes of an Infiniband™ Architecture network are normally provided by electrical signal carriers such as copper cables or optical signal carriers such as optical fibres. As discussed above, the maximum data rate of the interconnect is limited by the bandwidth of the selected channel. The physical layer also includes deskewing circuitry for compensating for skew latency in the channels.

Figure 6:
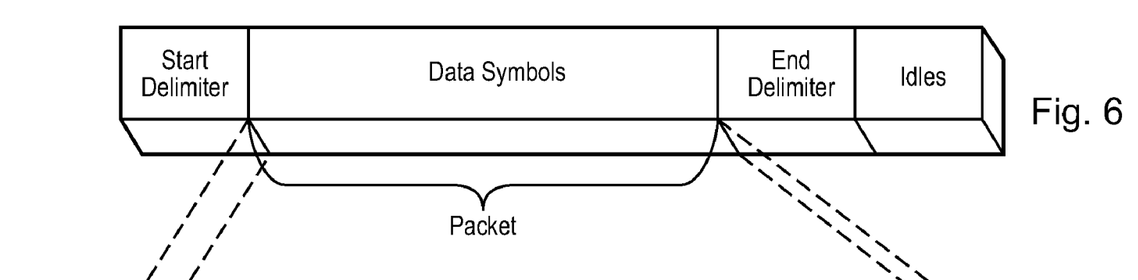
FIG. 6 shows schematically the structure of a message to be transmitted via an Infiniband™ Architecture.

The structure of a message to be transmitted through the fabric 12 via the interconnections 28 is illustrated in FIG. 6. As can be seen from FIG. 6, the message comprises a start delimiter, a packet comprising data symbols, an end delimiter and a number of idles.

Figure 7:
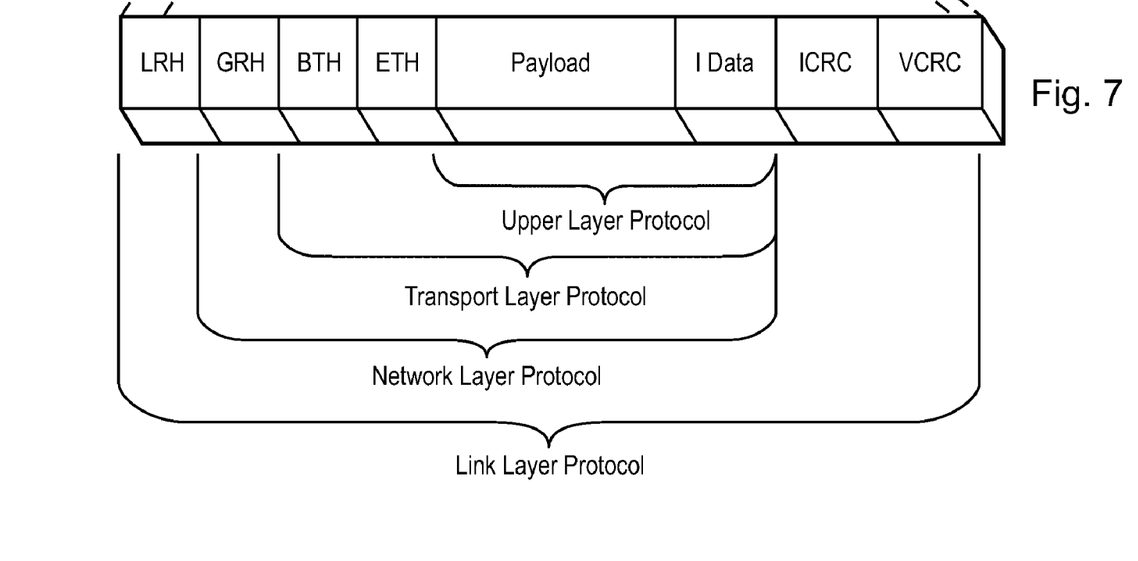
FIG. 7 shows schematically the format of a packet of the message of FIG. 6.

The data packet format is illustrated in FIG. 7. Packets may be one of two types, IBA (Infiniband™ Architecture) Packets or RAW (non-Infiniband™ Architecture) Packets. IBA Packets have IBA defined transport headers, are routed on Infiniband™ Architecture fabrics 12, and use native Infiniband™ Architecture transport facilities. Raw Packets may be routed on IBA fabrics but do not contain Infiniband™ Architecture transport headers. From the Infiniband™ point of view, these packets contain only Infiniband™ routing headers, payload and CRC. Infiniband™ Architecture does not define the processing of these packets above the link and network layers. These packets can be used to support non-Infiniband™ Architecture transports (e.g. TCP/IP, IPX/SPX, NetBUI etc) over an Infiniband™ fabric.

The Link Layer describes the packet format and protocols for packet operation, e.g. flow control and how packets are routed within a subnet between the source and the destination. Packets may be data packets which convey data between endnodes and which consist of a number of different headers which may or may not be present. Alternatively packets may be Link Management Packets which are used to train and maintain link operation. These packets are used to negotiate operational parameters between the ports at each end of the link such as bit rate, link width etc. The link layer is responsible for flow control handling to prevent the loss of packets due to buffer overflow by the receiver at each end of a link. This mechanism does not describe end to end flow control such as might be utilised to prevent transmission of messages during periods when receive buffers are not posted. The terms "transmitter" and "receiver" are utilised to describe each end of a given link. The transmitter is the node sending data packets. The receiver is the consumer of the data packets. Each end of the link has a transmitter and a receiver. The Infiniband™ Architecture utilises an "absolute" credit based flow control scheme that is to say that Infiniband™ Architecture receivers provide a "credit limit". A credit limit is an indication of the total amount of data that the transmitter has been authorised to send since link initialisation.

Credit control is performed by a media access control (MAC) protocol. With respect to a given link, a receiver advertises (by means of a link packet) that credit is available, the amount of which is based on the current status of the receiver's receive buffers. The transmitter receives the link packet and determines how much transmit credit is available from the contents of the link packet. The transmitter then assigns itself the available credit and transmits data packets to the receiver while simultaneously decrementing its available credit count. The transmitter calculates its remaining available credit based on the initial figure determined from the receiver link packet and a record of how much data it has transmitted since that link packet was received.

Errors in transmission, in data packets, or in the exchange of flow control information can result in inconsistencies in the flow control state perceived by the transmitter and receiver. The Infiniband™ Architecture flow control mechanism provides for recovery from this condition. The transmitter periodically sends an indication of the total amount of data that it has sent since link initialisation. The receiver uses this data to re-synchronise the state between the receiver and transmitter.

As can be seen in FIG. 7, the Link Layer adds a Local Route Header (LRH) to the front of the packet and adds Invariant and Variant Cyclic Redundancy Checks (ICRC and VCRC) to the end of the packet. The Local Route Header is always present and identifies the local source and local destination where switches 26 will route the packet. The Invariant Cyclic Redundancy Check covers all fields within the packet which do not change as the message traverses the fabric. The Variant Cyclic Redundancy Check covers all the fields of the packet. The combination of the two CRCs allows switches 26 and routers 30 to modify appropriate fields and still maintain data integrity for the transport control and data portion of the packet.

The Network Layer, which is present only within routers 30 and endnodes 32, describes the protocol for routing a packet between subnets 13. Thus a Global Route Header (GRH) is present in a packet that traverses multiple subnets 13. The Global Route Header identifies the source and destination ports of the message. Routers 30 use the contents of the Global Route Header to determine the forwarding requirements of the message. As the message traverses different subnets 13 the routers 30 modify the content of the Global Route Header and replace the Local Route Header but the source and destination port identities are not changed and are protected by the Invariant Cyclic Redundancy Check. Thus the Network and Link Layers operate together to deliver a packet to the desired destination.

The Transport Layer, which is present only within endnodes 32, delivers the packet to the proper Queue Pair within the Channel Adapter of the destination endnode 32 and instructs that Queue Pair as to how the packet's data should be processed. The transport layer also has responsibility for segmenting an operation into multiple packets when the message's data payload is greater than the maximum payload carryable by a single packet. The receiving Queue Pair then reassembles the data from the multiple packets at the destination endnode 32. The transport layer adds up to two headers to the packet. The Base Transport Header (BTH) is present in all IBA Packets but not in RAW Packets. It identifies the destination Queue Pair and indicates an operation code, packet sequence number and specifies the operation (Send, Read, Write etc). A number of Extended Transport Headers (ETH) may be present conditional on the class of service and operation code.

The Packet Sequence Number is initialised for a given Queue Pair as part of the communications establishment process and increments each time that Queue Pair creates a new packet. The receiving Queue Pair tracks the received Packet Sequence Number to determine whether any packets have been lost. For reliable service, the receiver endnode 32 may transmit and acknowledge signal back to the originator endnode to indicate whether all packets have been received successfully.

The Upper Level Protocols are completely software based and may comprise any number of protocols used by various user consumers. The payload is the data carried by the packet and I Data is handling data associated with a work activity to be performed on the payload. Also present in the Upper Level protocols are Subnet Management and Subnet Services protocols. These protocols provide management structure including management messages for management of the subnet 13. Each subnet 13 requires only a single Subnet Manager application 34 which may be present in a dedicated node (as illustrated in FIG. 4) or may reside in another node, including a switch 26 or a router 30 as well as an endnode 32.

Figures 8, 9:
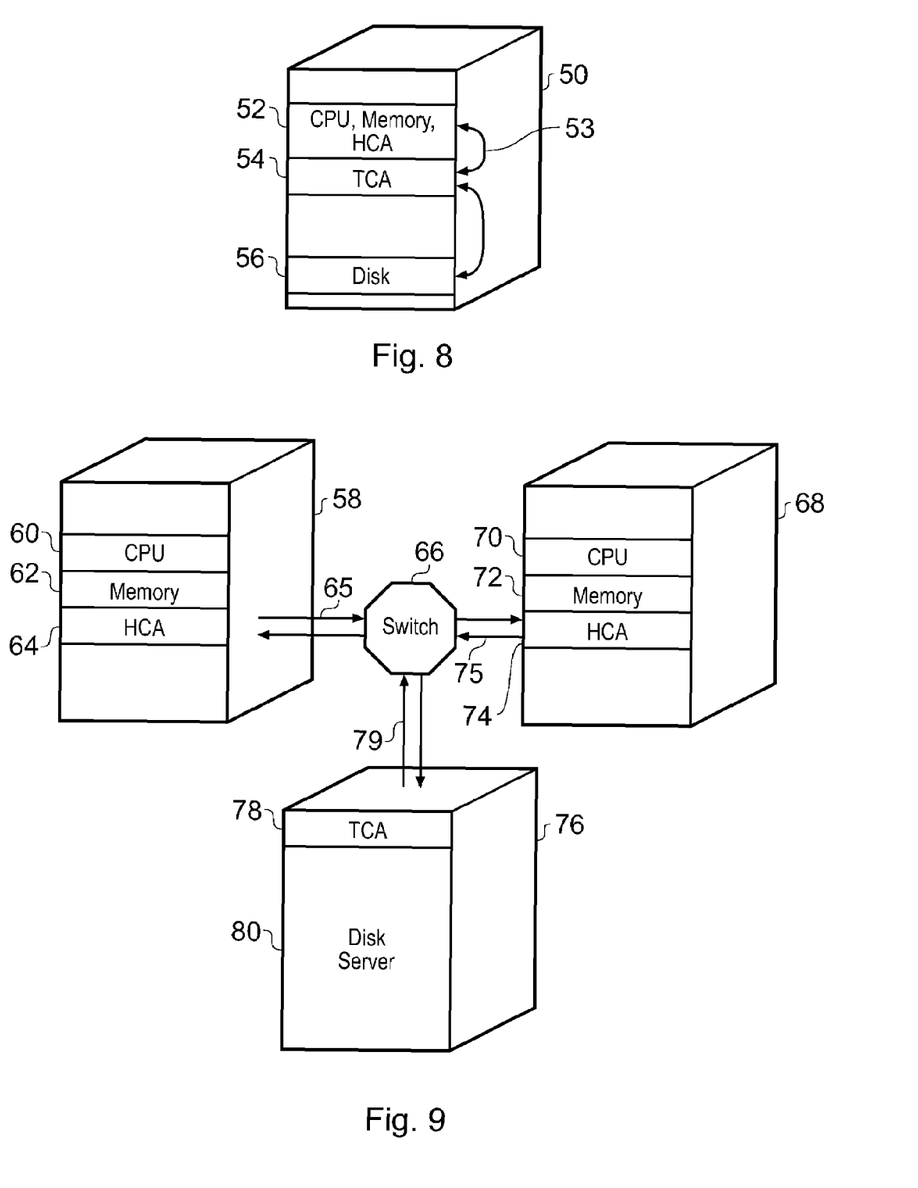
FIG. 8 is a schematic block diagram showing an arrangement where the Infiniband™ Architecture is used to interconnect components within a computer system.
FIG. 9 is a schematic block diagram showing an arrangement where the Infiniband™ Architecture is used as an interconnect between computer systems.

Examples of simple Infiniband™ Architecture systems are shown in FIGS. 8 and 9. FIG. 8 shows an arrangement where the Infiniband™ Architecture is used to interconnect components within a standard computer system rack 50. In this example, the CPU, Memory and a Host Channel Adapter 52 are interconnected using conventional non-Infiniband™ Architecture techniques. The Host Channel Adapter of the CPU, Memory and Host Channel Adapter 52 communicates via an Infiniband™ Architecture interconnect 53 with a Target Channel Adapter 54. The Target Channel Adapter 54 communicates with a disk drive unit 56 via a SCSI (Small Computer System Interface) connection. Thus the Infiniband™ Architecture is configured in this example to facilitate communications between elements of the same computer system.

FIG. 9 shows an arrangement where the Infiniband™ Architecture is used only as an interconnect between computers. In this example a first computer system is mounted in a rack 58 and comprises a CPU 60, memory 62 and a Host Channel Adapter 64 interconnected via conventional non-Infiniband™ Architecture techniques. Via the Host Channel adapter 64, the first computer system communicates to and from a Switch 66 across interconnects 65. Also connected to the Switch 66 is a second computer system mounted in a rack 68 and comprising a CPU 70, memory 72 and a Host Channel Adapter 74 which connects to the switch 66 via interconnects 75. Data storage for the first and second computer systems is provided by a disk server 80 mounted in a rack 76. The disk server 80 connects with a Target Channel Adapter 78 also mounted within the rack 76 by conventional non-Infiniband™ Architecture techniques. The Target Channel Adapter 78 connects to the switch 66 via interconnects 79. Thus the Infiniband™ Architecture is configured in this example to facilitate communication between more than one distinct computer systems. There is no limitation that the techniques of the examples of FIGS. 8 and 9 should be practised separately, a computer system using the Infiniband™ Architecture for internal communications may also be connected to other computer systems via a network based on the Infiniband™ Architecture.

Thus there has now been described an overview of the Infiniband™ Architecture for computer networking with examples of how it may be put into practice. Further details may be found in the above referenced Infiniband™ Architecture Specification Volumes 1 and 2, available from the Infiniband™ Trade Association, the contents of which are hereby incorporated hereinto by reference.

Figure 10:
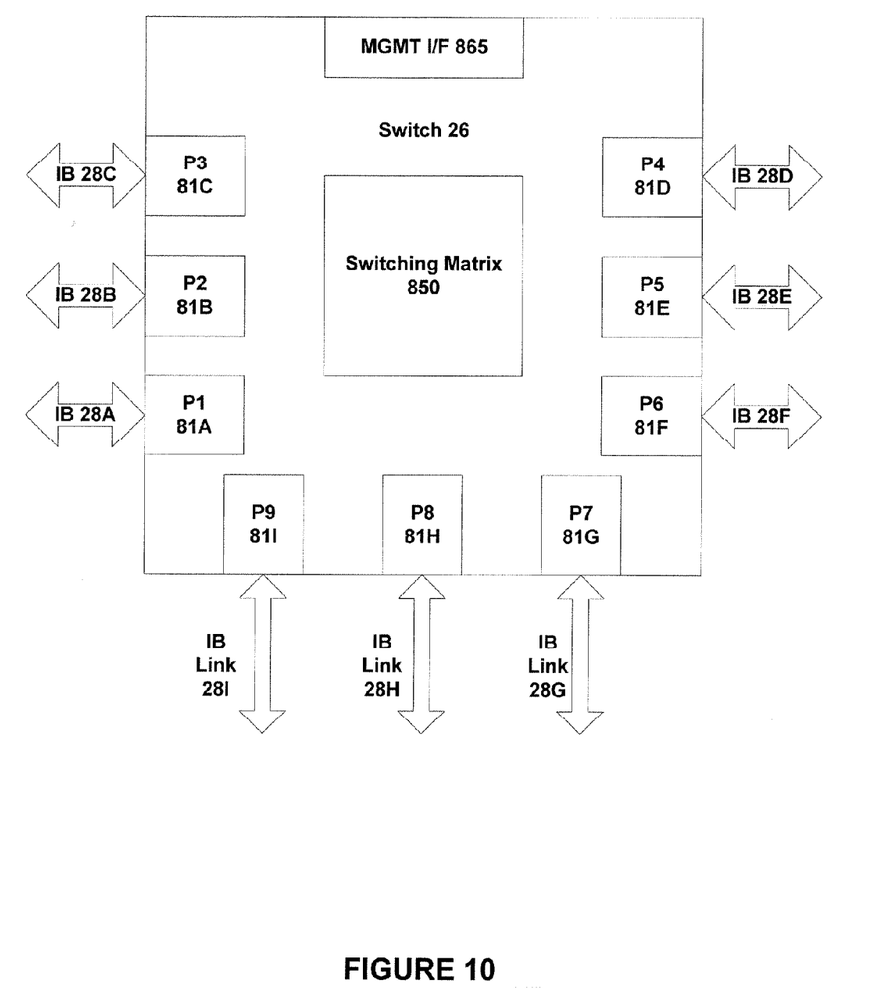
FIG. 10 is a schematic block diagram showing an example of a switch suitable for use in an Infiniband™ network.

FIG. 10 illustrates an example of a switch 26 suitable for use in an Infiniband fabric 12. Switch 26 can be implemented as a semiconductor device, for example an application specific integrated circuit (ASIC), and includes a management control interface 865, a subnet management agent (SMA) 866, multiple ports 81, and a switching matrix 850.

The management interface 865 provides access to the switch 26 for one or more external control systems, and can be used to configure switch 26 as appropriate depending upon the circumstances. For example, the subnet management agent 866 can communicate with the subnet manager 34 (see FIG. 4) via management interface 865.

In the present example, switch 26 has nine ports 81, denoted in FIG. 10 as P1 81A, P2 81B, P3 81C, P4 81D, P5 81E, P6 81F, P7 81G, P8 81H, and P9 81I. Each port is attached to a corresponding Infiniband duplex link 28 providing transmit (Tx) and receive (Rx) capability, and comprising one, four or twelve physical lanes. Each physical lane provides a basic data rate of 2.5 GHz, so that switch 26 provides connectivity for a total of 96 (9×12) lanes. The physical lanes into any given port are managed as a single logical link, and can be flow controlled using a credit-based link level flow control, as described above.

In accordance with the Infiniband Architecture, each link 28 can be subdivided into a maximum of sixteen virtual lanes (VL) to provide logically separate channels that are multiplexed onto a single logical link. The first fifteen virtual lanes (denoted VL0 through VL14) support general purpose data communications, while the remaining virtual lane (denoted VL15) is used for special management purposes. (Note that virtual lane VL15 is not flow-controlled, and so should be considered as not reliable). An Infiniband switch must support at least two virtual lanes on each link (i.e. data lane VL0 and management lane VL15). In one example, switch 26 supports four virtual lanes for general data communication plus one virtual lane for management purposes (VL15).

In accordance with the Infiniband Architecture, a packet can be specified as having one of sixteen different service levels (SLs). The service level for a particular packet is specified in the local route header (LRH), and remains constant as the packet transits an Infiniband subnet. The SL value in the packet determines the virtual lane over which the packet is transmitted across any given link in the subnet. This is achieved by having a switch maintain a set of SL-to-VL mappings (which are specific to each input port/output port combination). The SL-to-VL mappings are initialized and maintained by the subnet manager 34 (see FIG. 4).

On receipt of an incoming packet, a port first determines the output port to forward the packet to, based on the DLID value in the packet (as explained in more detail below). The port then uses the SL-to-VL mappings to decide the virtual lane over which the packet should be sent, given the SL value in the packet and the output port from which the packet will be transmitted. Note that since different switches may support different numbers of virtual lanes, a packet may be assigned to different virtual lanes for different links of its journey across a subnet.

The range of service levels can be used to provide a quality of service (QoS) mechanism in an Infiniband network. Thus any given virtual lane can be classified as low priority or high priority, and assigned a weight within that classification. The weight and classification of a virtual lane control its access to the bandwidth of the physical link, relative to the other virtual lanes supported over the same link. The service level of a packet then determines the virtual lane utilised by the packet over the link, in accordance with the SL-to-VL mappings. These mappings can be configured to reflect the number of virtual lanes provided by any given link and also the quality of service policy of the network.

The Infiniband Architecture supports the concept of partitioning in order to provide logical isolation of components sharing the same subnet. All nodes included in a route from a source to a destination must share the same 16-bit partition key (PK), otherwise they are unable to communicate with one another (or even to recognise each other's existence). An individual node may support multiple partition keys, and so belong to multiple different partitions.

A member of a partition can be denoted as a full member or a limited (partial) member, dependent on the high-order bit of the partition key. A full member can communicate with either a limited member or a full member, but a limited member cannot communicate with another limited member of that partition (only a full member). This model corresponds to a client-server architecture, where servers are full members and clients are partial members, and clients do not need generally to talk directly to one another.

Each queue pair at an end node has a partition key table which is assigned to it by the subnet manager 34 (see FIG. 4). A queue pair is assigned an index into the partition key table, and can then use this index to obtain and store the appropriate partition key into the local route header (LRH) for each outgoing packet. Conversely, a queue pair receiving a packet checks that the Pkey value within the incoming packet matches the indexed Pkey value in the Pkey table (if not, the incoming packet is discarded).

Each port 81 on switch 26 is provided with an input buffer (not shown in FIG. 10). The input buffer receives data arriving at a port 81 over its respective link 28, and stores this data pending transfer through the switching matrix 850. In the example mentioned above, each input buffer is divided into four sections, corresponding to the four virtual lanes on the associated link 28. This ensures that data from different virtual lanes is kept properly isolated.

Switching matrix 850 is used to transport data from one port to another. For example, if data arrives on link 28D at port P4 81D and is to be forwarded on link 28A, then switching matrix 850 is responsible for transferring the data from port P4 81D to port P1 81A (corresponding to link 28A). It will be appreciated that while ports 81 are constrained by the Infiniband standard (in order to ensure network connectivity), to some extent switching matrix 850 can be regarded as a more generic switching device, since it is internal to switch 26 and therefore shielded (at least in part) from other network devices.

The Infiniband architecture supports two general modes of communication. The first of these is unicast or point-to-point, in which each data packet goes from a single source to a single destination. This translates into switching matrix 850 transferring a packet from one incoming port to one outgoing port. The other mode of communication in Infiniband is multicast, in which a packet may be routed from a single source to multiple destinations. This is mirrored in the passage of the packet through switching matrix 850, whereby a packet from an incoming port may be directed to multiple outgoing ports.

It is desirable for the switch 26 to have low latency and high efficiency. A low latency implies relatively small amounts of buffering, otherwise delays through the switch will tend to increase. A high efficiency implies that the performance of the switch 26 is not degraded due to competition for resources within the chip as the load (i.e. the traffic through the switch) rises.

As part of the start-up procedure of an Infiniband network, the subnet manager 34 (see FIG. 4) assigns each end-node port in a subnet a local identifier (LID). Note that the individual ports 81 in switch 26 are not assigned their own LIDs, although an LID is assigned to port 0 of switch 26, which can be regarded as corresponding to management interface 865. (The switch management port, i.e. port 0, is considered an end-node in the Infiniband network, unlike the other switch ports).

Each LID comprises two portions, a base LID and a number of path bits. The number of path bits in the LID for a given port is determined by the LID mask count (LMC), which is also assigned by the subnet manager 34. Each packet in transit on the subnet contains the LID of the port from which it originated, namely the source LID (SLID), and also the LID for the port to which the packet is going, namely the destination LID (DLID). The SLID and the DLID are incorporated into the local route header (LRH) of the packet.

When a packet is received at its destination, the port checks that the DLID in the packet matches the LID for that port. Note that in this comparison the path bits of the LID are masked out, so that in effect the comparison is made against the base LID for the port. Thus for the purpose of destination checking, the path bits are ignored. However, in terms of routing a packet through a switch, the path bits are taken into consideration. This then allows multiple paths to be specified that all arrive at the same destination port. The ability to provide multiple paths through a subnet to the same destination port aids robustness and reliability within the network.

Packets arriving at each port of switch 26 must be correctly routed through the switching matrix 850. This is achieved through the use of a routing table (not shown in FIG. 10), which contains information about which port 81 of the switch 26 represents the shortest route to the ultimate destination of the packet. The routing table includes a list of possible destinations for a packet, each being associated with a port 81 of the switch 26. Packet destinations may include TCAs and management processors within Infiniband switches.

Figure 11:
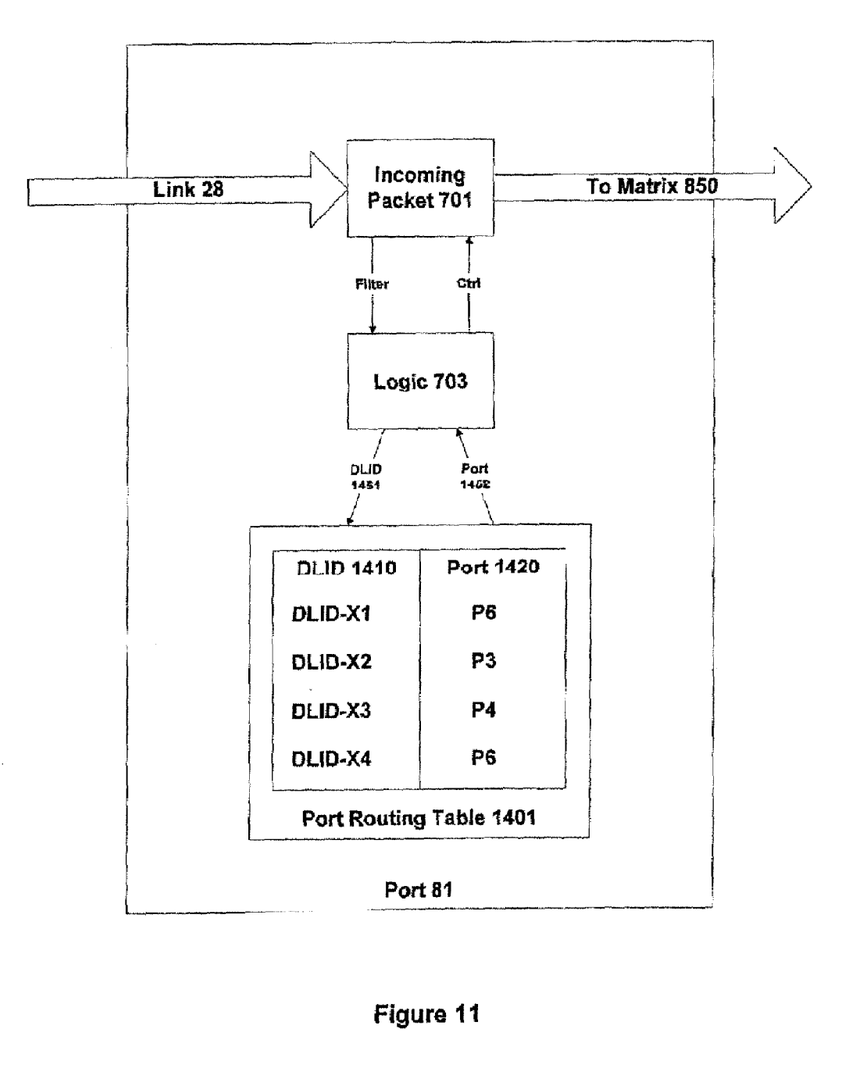
FIG. 11 is a schematic diagram of a port forwarding table for a port of the switch of FIG. 10.

FIG. 11 illustrates an example of a port 81 of the switch 26 which includes its own routing table 1401 in memory (e.g. RAM). This routing table 1401 can be made specific to the particular port 81 in which it is contained. The routing table 1401 can be regarded as having two columns, namely a first column 1410 representing DLID, and a second column 1420 representing port. Routing table 1401 can be indexed by DLID in order to obtain a port number.

In operation, port 81 receives an incoming packet 701 over link 28. The incoming packet 701 may be stored into a buffer or other component as appropriate. The DLID field of the incoming packet is then extracted from the packet header by an appropriate masking or filtering of the packet 701 and passed to logic 703. Note that in some examples, in order to maximise speed of processing, the DLID field for a packet may be extracted (and subsequently processed) before the complete packet itself has arrived at the port 81. This then avoids having to wait for the whole packet to arrive before a decision can be made as to where the packet should be routed.

Logic component 703 uses the DLID value 1451 extracted from the incoming packet 701 in order to index into (or otherwise access) port routing table 1401. In particular, logic 703 receives back from port routing table 1401 the port number 1452 that corresponds to the DLID value 1451 extracted from the incoming packet 701. For example, in the particular configuration shown in FIG. 11, if the incoming DLID value 1451 equals DLID-X2, then the incoming packet 701 is to be forwarded to Port 3 in the switch. Once logic 703 has determined the port 1452 to which incoming packet 701 should be directed, it performs appropriate control operations to route the packet through the switching matrix 850 to the specified port for onward transmission of the packet from the switch.

In the present example, port 81 forwards the packet to the output buffers of all the other ports on the switch. Port 81 also transmits an output buffer select message to the specified destination port, thereby allowing the packet to be stored into the output buffer of this particular port (for forwarding over the network). None of the other ports receives the output buffer select message, and accordingly they discard the forwarded packet.

Entries in the routing table 1401 are inserted via the management interface 865 of the switch 26 using information supplied by the subnet manager 34. The table can be updated via the management interface 865 in response to information describing the addition of new destinations, the removal of old destinations, and alterations to the network resulting in revised routings.

The use of per port-routing tables 1401 within switch 26 helps to reduce latency within the switch. Firstly, the routing table 1401 can be located adjacent the control logic for the port, thereby allowing very quick access. In addition, there is no possibility of contention delays caused by different ports all trying to access a shared routing table at the same time. In addition, if a routing table becomes unavailable at any time (e.g. because the routing information is being updated), then this does not impact all communications through the switch, but rather only communications through one port (the port that contains the particular routing table that is being updated).

In some examples, the routing tables 1401 within each port are copies of one another (i.e. all the routing tables are the same). In other examples however, the routing tables are customised to their associated port. For example, if a port is not included within a route to a given destination node, then the corresponding DLID can be omitted from the routing table for that port. One advantage of this is that it may allow the routing tables 1401 to be reduced in size, since they only need to accommodate a subset of routes through the switch (i.e. the subset of routes relevant to the particular port with which they are associated). In addition, it permits a much greater discrimination of packets within the network, including the ability to detect and remove certain aberrant packets (whether introduced into the network accidentally, for example due to some malfunction, or deliberately to disrupt proper operation of the network). Furthermore, it allows different path selections to be enforced on a per-port basis to the same end destination.

There are various possible implementations of routing table 1401. One possibility is to store DLIDs for supported routes, each with a corresponding port number 1420. (This corresponds to the general structure shown in FIG. 11). If a particular DLID is not present in the routing table 1401, then it is assumed that the DLID value is not valid for that port.

In another example, the DLID values themselves are not stored in routing table 1401, but rather are used to index into an appropriate port number (i.e. in this example the DLID column 1410 per se can be omitted from routing table 1401, its presence being implicit rather than explicit). In this case, some other mechanism (rather than just absence or presence of an entry in routing table 1401) is used to indicate whether or not a given DLID value is valid for the port. One possibility is to use one or more dedicated control bits to indicate the validity status of DLID. Another possibility is to use some predetermined (special) port number to indicate an invalid DLID, e.g. port −1 (assuming no real port on the switch has this designation).

One particular option is based on the fact that a single port cannot represent both the ingress and the egress for a given packet. Therefore, a port could store its own port number into routing table 1401 to indicate an invalid DLID. In other words, if the port number 1452 returned for a given DLID 1451 (see FIG. 11) represents the port into which the packet has been received (i.e. the port containing the routing table in which the lookup is being made), then it is known that the DLID is not valid for that port, and accordingly an error is raised.

One advantage of using a port's own number in this manner to depict an invalid DLID for the port is that it can allow a compact representation of the routing table 1401. In particular, it may be possible to represent an invalid DLID using the same set of bits that are allocated already to indicate the output port in routing table 1401. (This is in contrast to the addition of an extra control bit, which may represent a significant percentage increase on the size of a routing table, e.g. 25%).

The use of per port routing tables permits the provision and enforcement of different routes for the same destination as a function of source node (or more particularly, the ingress port into the switch). This avoids end nodes having to set up and adhere to complicated multiple routings based on LMC bits in the destination identifier.

An example of a latency optimised arrangement for determining a virtual lane to meet a service level requirement for transmission of a packet will now be described with reference to FIG. 12.

As described above, within an Infiniband packet, there can be a destination location identifier (DLID) field which specifies the ultimate destination of the packet. There can additionally be a service level (SL) field which specifies the service level required by that packet.

Figure 12:
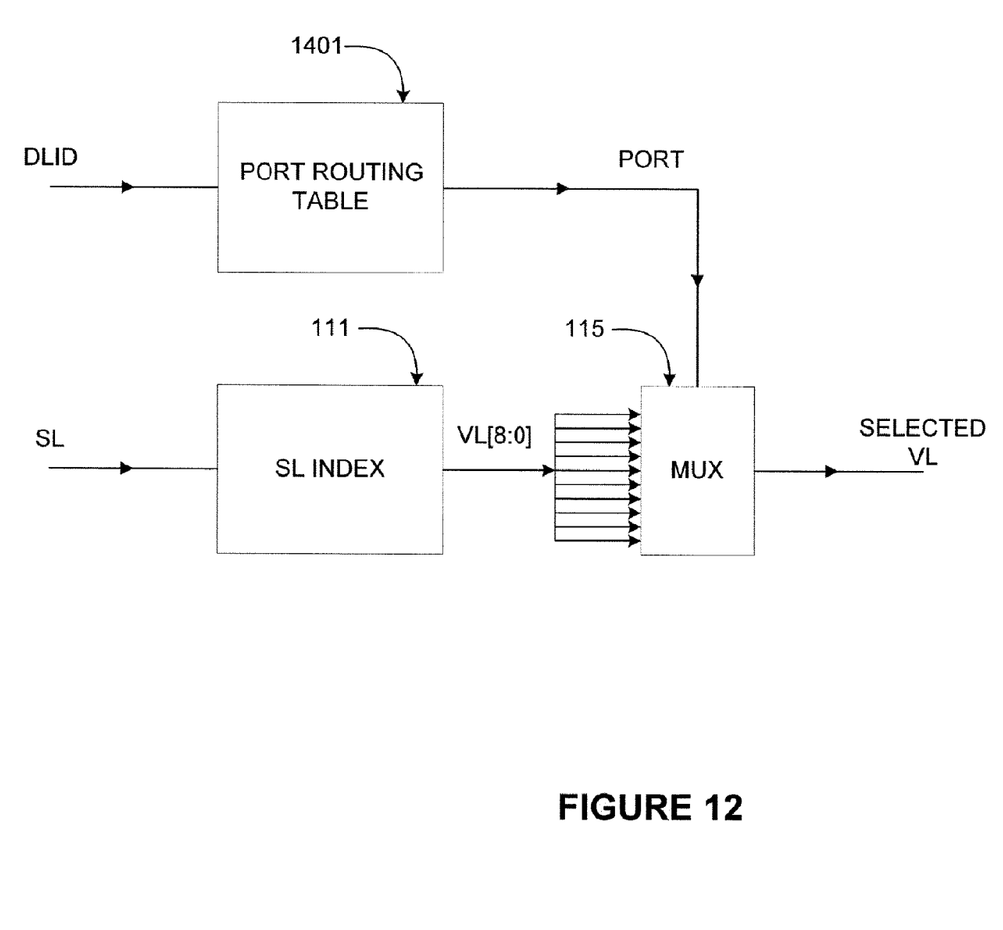
FIG. 12 is a schematic representation of an arrangement for determination of a virtual lane.

As shown in FIG. 12, a the DLID is fed to the port routing table 1401 as discussed with reference to FIG. 11 above. The port routing table 1401 then provides an output specifying which port of the switch the packet is to be retransmitted from. In parallel with the determination of the output port, a service level index lookup 111 is used to determine the required virtual lane of the output port.

The input to the service level index lookup is the service level required by the packet. As the output port is not yet known, the service level index lookup determines which virtual lane would be required to meet the specified service level for each port of the switch. Thus, in the context of the example of FIG. 10, a virtual lane is determined for each port P1, P2, P3, P4, P5, P6, P7, P8 and P9. Therefore the output from the service level index lookup one virtual lane value associated with each port of the switch. Although the Infiniband specification does not normally provide for routing of packets back out of a switch port which received that packet at the switch (a loopback mode of operation), the arrangement of the present example does allow such an operation mode to be used for test and diagnostics purposes and therefore in the present example a virtual lane is determined for each port of the switch, including the port at which the packet has been received.

In order to finally determine the correct virtual lane, the port select output from the table 83 is used to select between the multiple virtual lane outputs from the service level index lookup 111 at a multiplexer 115. Thus the virtual lane output from the service level index lookup 111 corresponding to the port selected by the table 83 is output from the multiplexer 115 as the selected VL. This final output specifies the port from which transmission of the packet is to occur and the virtual lane of that port which the packet is to be transmitted over.

It has been found in practice that the determination of the port at the table 83 takes slightly less than one Infiniband low frequency clock cycle. The calculation of the virtual lanes at the service level index lookup also takes less than one Infiniband low frequency clock cycle. There is thus sufficient time left within that single clock cycle to cause the switching of the multiplexer. Accordingly, the entire virtual lane determination process of the present example takes only a single clock cycle, thereby providing an optimal arrangement for determining the virtual lane.

As the skilled addressee will appreciate, the low frequency Infiniband clock is 250 MHz, being 1/10 of the clock frequency for transmission across a physical link (2.5 GHz). Thus factor of 10 clock difference occurs as a result of the data being transmitted serially across a link, but being deserialised for handling with an Infiniband device. As set out in the Infiniband specification, the data is encoded from 8 bit bytes into 10 bit data units for transmission.

Thus there has now been described minimal latency apparatus and method for determining an output port and virtual lane for a packet being transmitted from a multi-port Infiniband device. Thus latency within an Infiniband device such as a switch can be advantageously reduced.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

The invention claimed is:

1. An Infiniband device having an input port for receiving a packet, the port being operable to extract a destination descriptor and a quality of service requirement descriptor for the packet and simultaneously to determine an output port of the device for onward transmission of the packet on the basis of the destination descriptor and to determine an output port virtual lane for each output port of the device on the basis of the quality of service requirement descriptor, and operable subsequently to use the determined output port to select between the determined output port virtual lanes, wherein the port is operable to determine the output port and the output port virtual lanes within one Infiniband low frequency clock cycle.

2. The device of claim 1, wherein the port is additionally operable to select an output port virtual lane within the same Infiniband low frequency clock cycle.

3. The device of claim 1, wherein the device is a switch.

4. The device of claim 1, wherein the device is a router.

5. An Infiniband device having an input port for receiving a data packet, and a plurality of output ports for transmitting a data packet, each output port supporting a plurality of virtual lanes, the input port comprising:
   an interrogation unit for extracting a destination identifier and a service level identifier from the data packet;
   a first determining unit for determining an output port of the device on the basis of the destination identifier;
   a second determining unit for determining an output virtual lane for each output port of the device on the basis of the service level identifier, the second determining unit being operable in parallel with the first determining unit; and
   a selection unit for selecting between the determined output virtual lanes on the basis of the determined output port;
   wherein the first and second determining units and the selection unit are operable to determine the output port, determine the output port virtual lanes and select an output port virtual lane, respectively within a single Infiniband low frequency clock cycle.

6. The device of claim 5, wherein each output port virtual lane has an associated quality of service characteristic, and wherein the second determining unit is operable to match the service level identifier of the packet with a quality of service characteristic of each output port virtual lane to determine the output port virtual lane for each output port.

7. The device of claim 5, wherein the first and second determining units operate simultaneously.

8. The device of claim 5, wherein the device is a switch.

9. The device of claim 5, wherein the device is a router.

10. An Infiniband device having input port means for receiving a data packet, and a plurality of output port means for transmitting a data packet, each output port means supporting a plurality of virtual lanes, the input port means comprising:
   interrogation means for extracting a destination identifier and a service level identifier from the data packet;
   first determining means for determining an output port of the device on the basis of the destination identifier;
   second determining means for determining an output virtual lane for each output port means of the device on the basis of the service level identifier, the second determining means being operable in parallel with the first determining means; and
   selection means for selecting between the determined output virtual lanes on the basis of the determined output port;
   wherein the first and second determining means and the selection means are operable to determine the output port determine the output port virtual lanes and select an output port virtual lane, respectively, within a single Infiniband low frequency clock cycle.

11. A method for determining an output virtual lane for a packet for transmission from an Infiniband device, the method comprising:
   in parallel using a destination descriptor of a destination for the packet to determine an output port for transmission of the packet, and using a service level descriptor of the packet to determine a virtual lane for transmission of the packet for each output port of the device; and
   using the determined output port for the packet to select between the virtual lanes determined for transmission of the packet, to select an actual virtual lane for transmission of the packet;
   wherein the determining of the output port and the determining of the virtual lane for each output port each has a duration of less than a single low frequency Infiniband clock cycle.

12. The method of claim 11, wherein the determining of the output port and the determining of the virtual lane for each output port are carried out simultaneously.

13. The method of claim 11, wherein the entire method has a duration of less than a single low frequency Infiniband clock cycle.

14. The method of claim 11, wherein the device is a switch.

* * * * *